H. BENTLEY.
CHURN.
No. 3,556.                    Patented Apr. 20, 1844.
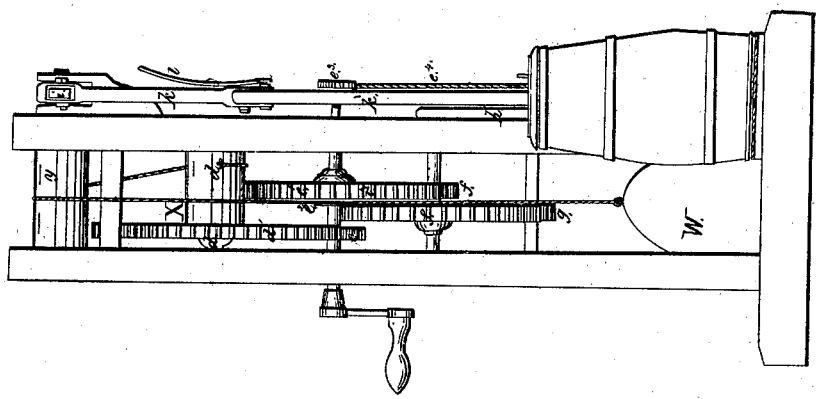
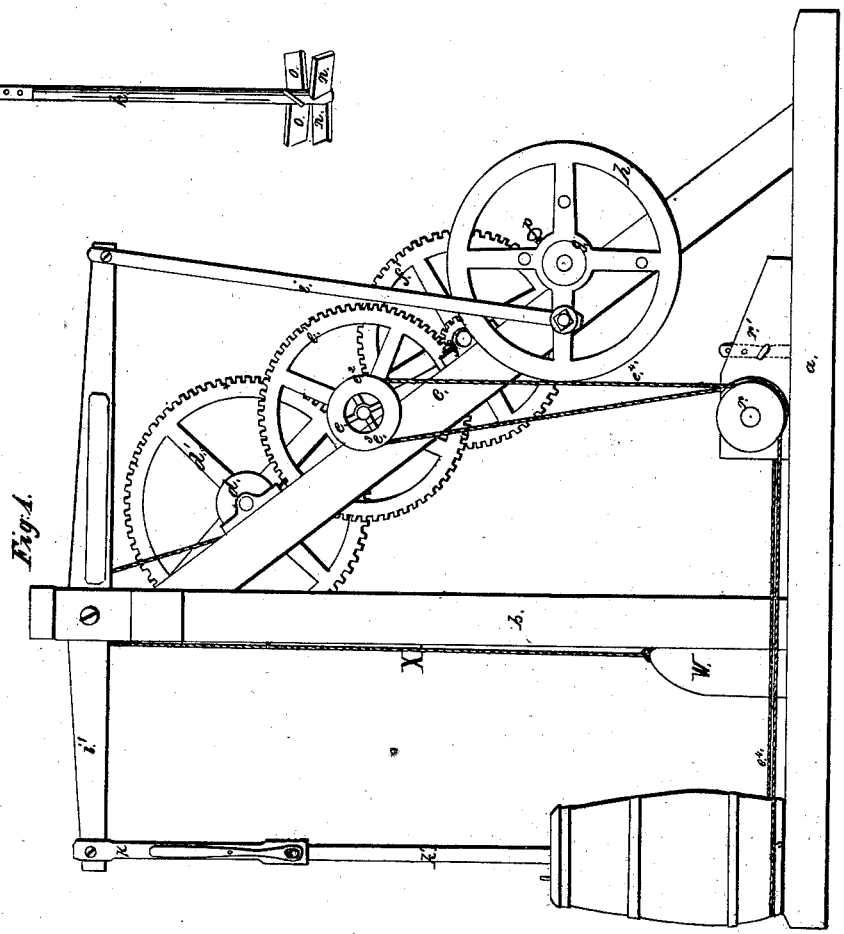

UNITED STATES PATENT OFFICE.

HARMESS BENTLEY, OF BALLSTON, NEW YORK.

CHURN.

Specification of Letters Patent No. 3,556, dated April 20, 1844.

*To all whom it may concern:*

Be it known that I, HARMESS BENTLEY, of Ballston, in the county of Saratoga and State of New York, have invented a new and useful Improvement in Churns; and I do hereby declare that the following is a full, clear, and exact description thereof, reference being had to the accompanying drawings, which form a part of this specification, in which—

Figure 1, is a side elevation; Fig. 2, a front elevation; Fig. 3, is the dasher detached.

The driving power of my churn is a weight ($w$) which is suspended by a cord ($x$) that passes up over a pulley or roller ($y$) situated at any height above it; from them the cord descends to a drum ($d$) around which it is wound. On the drum shaft a spur wheel is fastened that gears into a pinion ($e$) on a shaft below; on this shaft is a wheel ($e'$) that turns loosely on said shaft; it can be connected with the shaft when turning in one direction by means of a ratchet wheel ($e^2$) and pawl ($i^2$) in the same manner as the barrel of a clock. On the same shaft outside the frame there is a pulley ($e^3$) around which an endless band ($e^4$) passes down to two pulleys ($r$) below and from thence horizontally forward and around a horizontal wheel ($s$) on which the churn rests, and by which it is turned. The pulleys ($r$) placed side by side, only one of which is shown, can be raised or lowered in any convenient way so as to stop or put in motion the churn as required. This can be done by attaching the pulleys to a piece ($r'$) that is movable and tightening or slackening the band ($e^4$). The wheel ($e'$) works into a pinion ($f$) connected with the same shaft as the spur wheel ($f'$) that drives a pinion ($g$) on the balance wheel shaft. The balance wheel ($h$) has a crank pin on one of its arms that is made adjustable at a greater or less distance from the center. This is connected with a horizontal working beam ($i'$) by a rod ($i$). To the other end of the working beam a shackle bar ($k$) is connected that hangs down and has a slot in its lower end of sufficient length through which two bolts pass, the lower one being connected with a spring thumb piece ($l$) outside so that when the thumb piece is pressed down it draws out the bolt. The handle ($k$) of the dasher is made to fit the slot and has a notch cut in its upper end; below this slot or notch are two or three holes (see Fig. 3). When the end of this dasher is slipped into the slot in the shackle the notch embraces the upper shackle and the pin on the spring thumb piece enters one of the holes in the dasher handle which regulates its length. Thus as the length of the crank is altered that of the handle can be adjusted to it and the dash always in its down stroke play near the bottom of the churn.

At the commencement of the operation the cord or band ($e^4$) is slack; by raising pulleys ($r$) when butter comes the pulleys are brought down and the churn is made to revolve slowly, and by reason of the additional power required to drive the machinery the dash moves slower, thus gathering, and afterwards working the butter in the most perfect manner.

Having thus fully set forth my improvements, I wish it to be understood that I do not claim driving the dash of a churn by weights as that has been before effected although in a manner somewhat different from mine, but

What I claim as my invention and desire to secure by Letters Patent is—

The employment of a revolving churn and reciprocating dash, in combination with the driving power as herein described for making and working butter.

HARMESS BENTLEY.

Witnesses:
J. J. GREENOUGH,
LAFAYETTE CALDWELL.